United States Patent [19]

Narahara et al.

[11] Patent Number: 5,239,528
[45] Date of Patent: Aug. 24, 1993

[54] OPTICAL HEAD CONTROL CIRCUIT FOR OPTICAL TAPE RECORDING/REPRODUCING APPARATUS

[75] Inventors: Tatsuya Narahara; Yoshiteru Kamatani, both of Kanagawa; Kiyoshi Ohsato, Chiba; Hiroshi Miyoshi, Tokyo, all of Japan

[73] Assignee: Sony Corporation, Tokyo, Japan

[21] Appl. No.: 581,800

[22] Filed: Sep. 13, 1990

[30] Foreign Application Priority Data

Sep. 13, 1989 [JP] Japan .................................. 1-235604

[51] Int. Cl.⁵ ................................................. G11B 7/09
[52] U.S. Cl. .............................. 369/44.18; 369/44.34; 369/44.35; 369/97
[58] Field of Search ............... 369/44.17, 44.18, 44.25, 369/44.34, 44.35, 97, 110, 111, 125; 358/345, 347, 348; 360/10.2, 77.13, 77.16

[56] References Cited

U.S. PATENT DOCUMENTS

| | | | |
|---|---|---|---|
| 4,416,001 | 11/1983 | Ackerman et al. | 369/97 X |
| 4,495,609 | 1/1985 | Russell | 358/347 X |
| 4,633,455 | 12/1986 | Hudson | 369/97 X |
| 4,661,941 | 4/1987 | Bell et al. | 369/97 X |
| 4,669,070 | 5/1987 | Bell | |
| 4,970,707 | 11/1990 | Hara et al. | 369/44.17 X |

FOREIGN PATENT DOCUMENTS

0284377 9/1988 European Pat. Off. .

Primary Examiner—Wayne R. Young
Attorney, Agent, or Firm—Lewis H. Eslinger; Jay H. Maioli

[57] ABSTRACT

A control circuit for controlling the position of a head in an optical tape recording/reproducing device having a rotary optical head controls the position of the head at the instant that it faces the tape based upon a desired head position derived from a preceding period in which it was facing the tape. A head position error signal is sampled and added to a sample head position signal during a period when the head is facing the tape and is held during the time the head is not facing the tape. The instant the head begins to face the tape once again, this desired value that has been held is applied to the head in order to reduce the pull-in time of the control circuit and provide more time for information recording/reproduction during the time the rotary optical head is facing the tape.

6 Claims, 6 Drawing Sheets

OPTICAL HEAD CONTROL CIRCUIT FOR OPTICAL TAPE RECORDING/REPRODUCING APPARATUS

FIELD OF THE INVENTION

The present invention relates generally to an optical tape recording/reproducing apparatus having a pair of rotary scanning optical heads and, more particularly, to an optical head control circuit for use in such apparatus.

DESCRIPTION OF THE BACKGROUND

Figure 1:
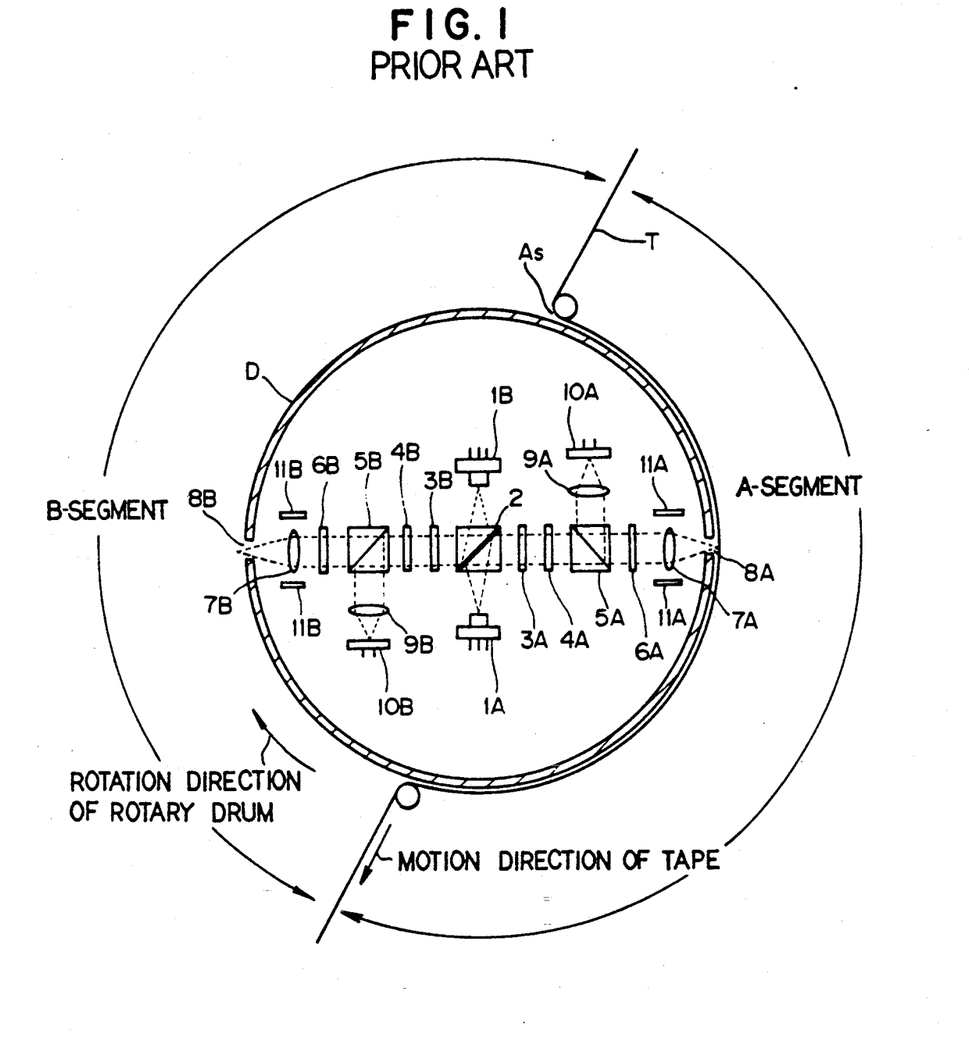
FIG. 1 is a schematic illustration of the structure of a rotary scanning optical head device.

Technical development is currently in progress relative to recording/reproducing apparatus using an optical tape as a recording medium and such apparatus is schematically shown in FIG. 1. Typically, a pair of rotary scanning optical head devices are employed in such optical tape recording/reproducing apparatus, for example, having two laser beam sources and two heads disposed opposite to each other at an angular interval of 180 degrees. More specifically, in the optical head device of FIG. 1, two laser diodes 1A, 1B are incorporated in a rotary drum D at symmetrical positions so as to be spaced apart from each other at a predetermined interval, and a reflection prism 2 is interposed between laser diodes 1A, 1B. Along the light paths of the laser beams directed by reflection prism 2 there are sequentially disposed collimation lenses 3A, 3B, grating plates 4A, 4B, polarized beam splitters 5A, 5B, quarter-wave plates 6A, 6B, and objective lenses 7A, 7B. Recording-/reproducing laser beams emitted from laser diodes 1A, 1B are forwarded via the above-described optical systems to the outside of the rotary drum D through apertures 8A, 8B, respectively, to finally arrive at an optical tape T that is helically arranged around rotary drum D over an angular range of substantially 180 degrees. In this manner a signal is recorded on the optical tape T, or a recorded signal on the tape T is reproduced therefrom, as slanted tracks of data running transverse to the length of the record medium.

The laser beam reflected from the optical tape T that can serve as either a reproduced data signal or a focusing/tracking control signal is passed via objective lenses 7A, 7B, quarter-wave plates 6A, 6B, and polarized beam splitters 5A, 5B to reach light receiving lenses 9A, 9B, whereby it is further irradiated onto two photo detectors 10A, 10B, respectively. The output signals of detectors 10A, 10B are supplied to reproduced-signal processing circuits and servo circuits (not shown).

The focusing/tracking control signals produced by such servo circuits are supplied to servo controlled actuators 11A, 11B, which may comprise dual-axis lens moving mechanisms or the like, so that the objective lenses 7A, 7B are driven to correct focusing positions or to correct tracking positions.

For example, when a pair of optical heads are incorporated in a rotary drum as described above, the optical heads sequentially scan the optical tape every half rotation of the rotary drum in compliance with the motion of the optical tape, thereby performing a helical-scan recording/reproducing operation.

In the case where the tape winding angle is 180 degrees as in the above-described example, each optical head comes to have in accordance with the rotation of the rotary drum D as illustrated in FIG. 1, a scanning period, hereinafter referred to as A-segment, facing toward optical tape T and a non-scanning period, hereinafter referred to as B-segment, facing away from optical tape T.

A reflected laser beam is not obtained during the non-scanning period of the head, so that the tracking and focusing control signals produced on the basis of the reflected laser beam are not obtained until the optical head advances into the A-segment again. Therefore, the focusing or tracking condition upon entering from the B-segment into the A-segment is rendered unstable because there is no servo control. Moreover, even upon detection of a focusing error signal or a tracking error signal after entering into the A-segment, it is still impossible to achieve rapid control for moving the laser beam spot to a desired track or placing the same in a correct focus condition in response to a detected error signal. Furthermore, as the control error signal becomes greater, a longer time is required for pulling the lens into correct focus or into the correct tracking position due to transient vibrations.

When such required servo pull-in time interval is prolonged, an effective time interval that equals the A-segment minus the pull-in time interval, which is the effective recording/reproducing time, is shortened to raise consequently a serious problem with respect to the record signal transfer rate or the recording density. In order to solve this problem, it has been customary heretofore that the tracking and focusing control errors at the end of the A-segment are held as in the preceding stage, and the position of the actuator is locked until the next entering of the optical head into the A-segment.

Figure 2A:
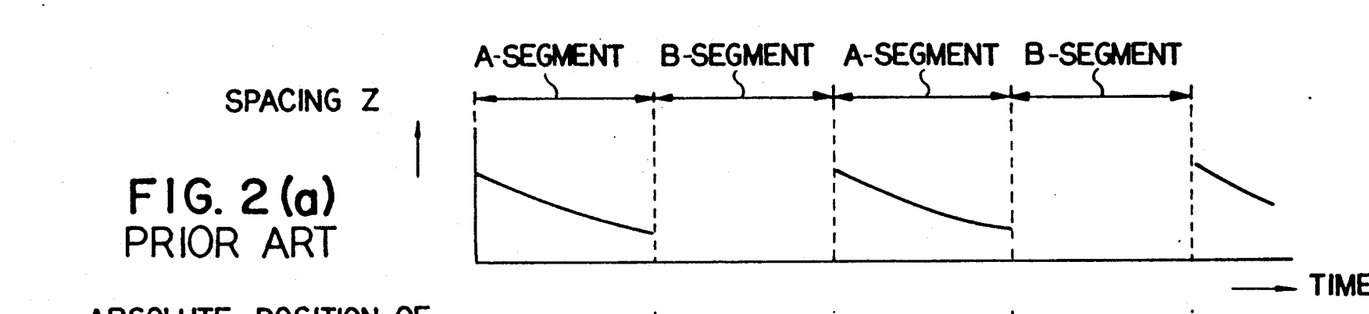
FIGS. 2(a) and 2(b) graphically show the positions of the tape and the lens, respectively, in the system of FIG. 1.

Nevertheless, the spacing Z between tape T and the optical head in the A-segment during the motion of tape T is generally affected, as illustrated in FIG. 2(a), by a thin air film layer or space formed due to flow of air from a point $A_s$ in FIG. 1 where the moving tape T is initially brought into contact with drum D, so that the distance Z between tape T and drum D at the beginning of the A-segment is gradually reduced in accordance with the rotation, until finally tape T is brought into its closest contact with drum D at the end of the A-segment.

Figure 2B:
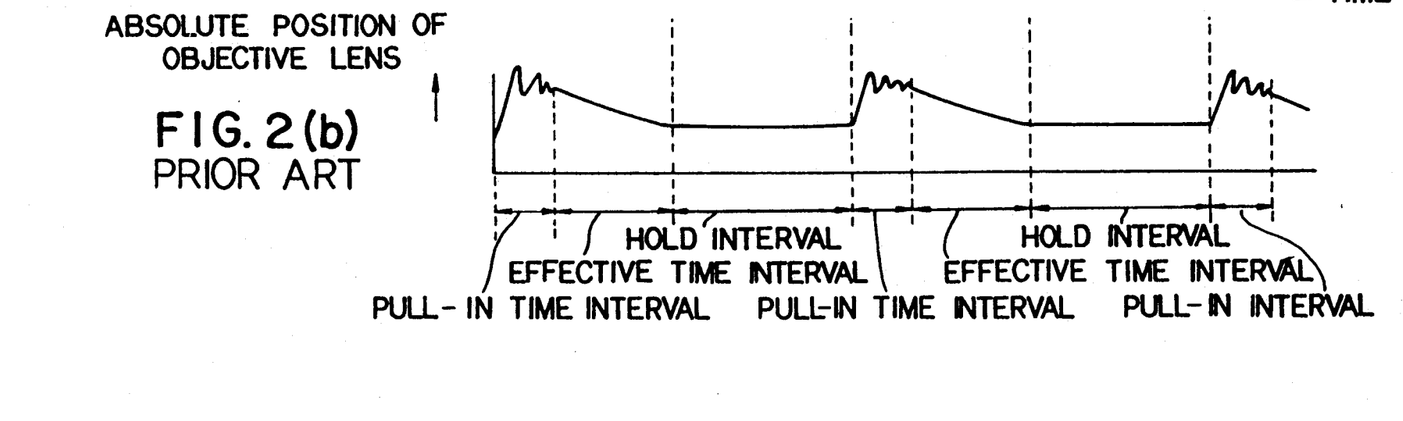

By means of the focusing control signal that follows up such change in the distance Z in the A-segment, the absolute position of objective lens 7 is changed in the effective time interval, as shown in FIG. 2(b). If there occurs a considerable difference in the correct focusing position between the start portion and the end portion of the A-segment, and the focusing actuator is controlled during the non-scanning period to hold the lens position at the end of the A-segment, then the optical head enters into the next A-segment at a position considerably spaced apart from the correct focusing position. Therefore, at the time of pulling in to the correct focusing position, as illustrated, stable servo control cannot be rapidly executed and effective reduction of the pull-in time interval is presented.

Figure 3A:
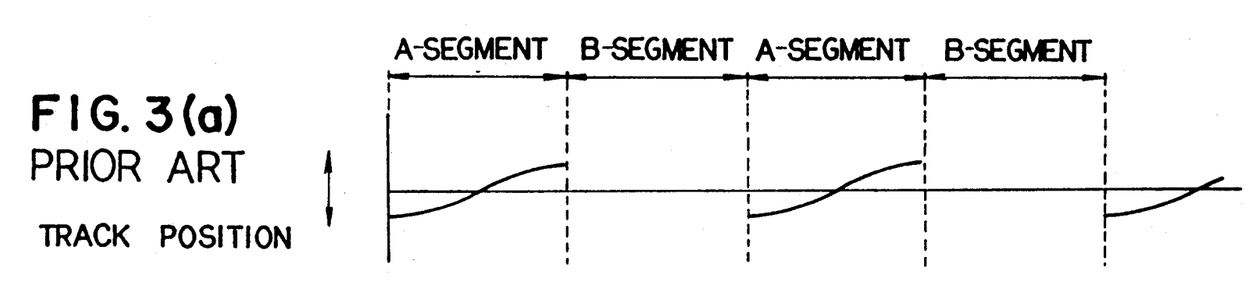
FIGS. 3(a) and 3(b) graphically show the positions of the track and the light beam spot, respectively, in the system of FIG. 1.
Figure 3B:
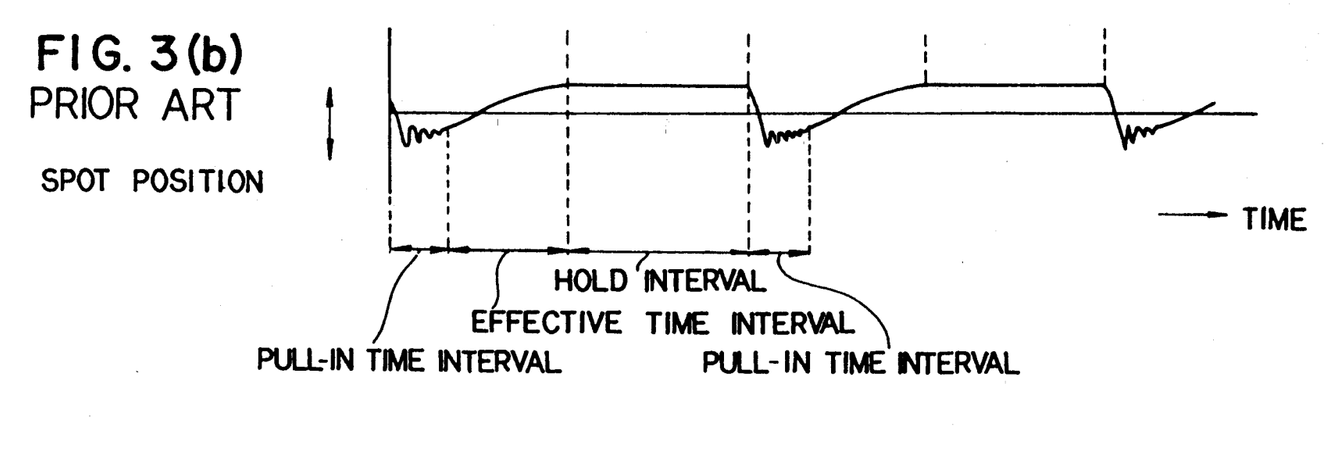

The above problems apply to tracking control as well. For example, due to some long-cycle meander of the tape path or the tape edges, the track position is prone to have an S-shaped deviation as shown in FIG. 3(a). Therefore, the tracking control signal will have a waveform as shown in FIG. 3(b), which eventually necessitates a relatively long pull-in time interval.

OBJECTS AND SUMMARY OF THE INVENTION

Accordingly, it is an object of the present invention to provide a control system for an optical head recording/reproducing apparatus that can eliminate the above-noted defects inherent in the prior art.

It is another object of this invention to provide an improved optical head control circuit for use in an optical tape recording/reproducing apparatus having a pair of rotary scanning type optical head devices for effectively shortening the pull-in time interval with regard to focusing and tracking control.

It is a further object of this invention to provide an optical head control circuit in which an actuator position signal and a focusing error signal, or a tracking error signal, are sampled by a desired-value setting circuit, and then a desired value is prepared in accordance with such sampled values. Subsequently the focusing position, or the tracking position, at the instant of the next entering of the optical head into the tape-opposed period segment after one rotation of the rotary drum is controlled in accordance with value thus prepared.

In accordance with an aspect of the present invention, there is provided an optical head control circuit that comprises an error detector optically coupled to a rotary optical head for generating error signals, a head driving circuit supplied with the error signals from the error detector for adjusting the position of the rotary optical head during a scanning period wherein the rotary optical head is facing the optical tape, an error sampling circuit connected to the error detector for sampling error signals at the beginning of the scanning period, a head position detector coupled to the rotary optical head for generating head position signals and a circuit for supplying head position control signals that are generated on the basis of the head position signals and the sampled error signals to the head driving circuit instead of the error signals during a non-scanning period, where the head is not facing the optical tape.

According to another aspect of the present invention, there is provided an optical head control circuit wherein the optical tape is wound on the periphery of a tape guide drum over an angle of about 180 degrees, and the head assembly includes a pair of heads disposed in the tape guide drum at positions spaced apart from each other by an angle of 180 degrees. By addition of the error signal and the actuator position signal at the instant of entering the optical head into one period segment when the head faces the optical tape, a correct focusing position, or correct tracking position, of the objective lens at such instant can be obtained. The result of such addition is then determined as a desired value, and the lens actuator position at the instant of a next entering of the optical head into the tape-facing period segment after one rotation of the rotary drum is controlled in conformity with such desired value, so that the optimum focusing or tracking position of the lens is ensured upon entering into the tape-facing segment.

In this case, the correct focusing position, or correct tracking position, of the lens at the instant of entering into the A-segment, that is, the position corresponding to the desired value, is not exactly rendered coincident with a complete correct focusing position, or tracking position, at the next time of entering into the A-segment. Nevertheless, because a substantial coincidence is attainable therebetween, it is possible to execute control to a proper position within an extremely short pull-in time interval to consequently realize a quick pull-in operation.

The above and other objects, features, and advantages of the present invention will become apparent from the following detailed description of illustrative embodiments thereof, to be read with reference to the accompanying drawings.

DESCRIPTION OF THE PREFERRED EMBODIMENTS

Figure 4:
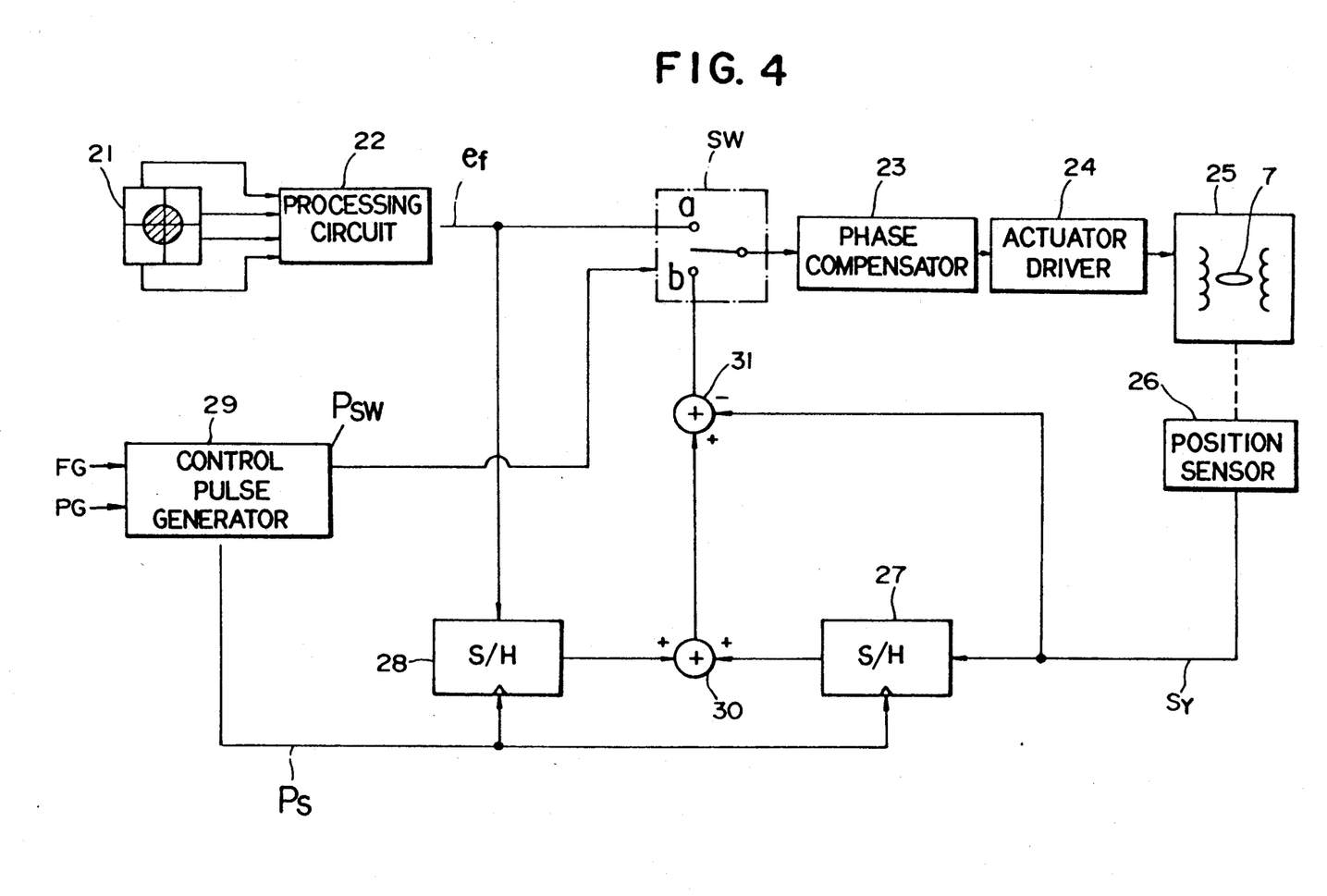
FIG. 4 is a block diagram of a control system according to an embodiment of the present invention.

FIG. 4 is a block diagram of a focusing control circuit according to an embodiment of the present invention, in which a four-part photo detector 21 detects the reflected light from an optical tape and a processing circuit 22 produces a focusing error signal $e_f$ on the basis of the output of detector 21. The output of processing circuit 22 is fed through a phase compensator 23 and an actuator driver 24 to a focusing actuator 25.

Figure 5:
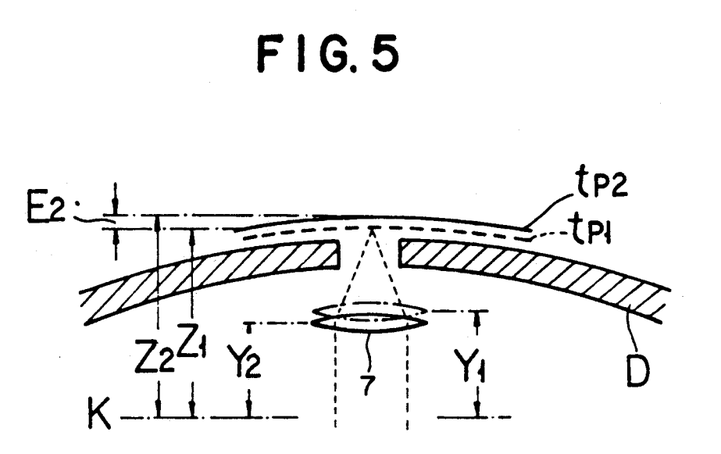
FIG. 5 is a pictorial representation of the absolute positions of the lens and the tape in the system of FIG. 1.

A position sensor 26 senses the position of actuator 25 relative to an absolute position Y of an objective lens 7 relative to a predetermined reference position K, as illustrated in FIG. 5. Position sensor 26 produces a position signal $S_y$ for controlling actuator 25 to retain same at the desired position.

A sampling/holding circuit 27 (S/H) samples the position signal $S_y$ by the use of a sampling pulse $P_s$ generated from a control pulse generator 29 at the time of entering into an A-segment. A second sampling/holding circuit 28 (S/H) samples the focusing error signal $e_f$ also in accordance with sampling pulse $P_s$. Control pulse generator 29 also produces a control pulse $P_{SW}$ from an FG signal or a PG signal used to servo control the motor (not shown) that is for driving drum D in all such well-known rotary head scanning systems.

An adder 30 adds the signals that are sampled and held by the S/H circuits 27, 28, thereby producing the so-called desired value that represents a focus control position. A subtractor 31 produces an actual focusing error signal by subtracting the actual position signal $S_y$ from the generated desired-value signal.

A switch circuit SW whose terminals a and b are selectively connected to the switch output in response to switching control signal $P_{SW}$ supplied from control pulse generator 29. As will be described later, the terminal b is connected at a predetermined instant prior to the head entering into the A-segment, and the terminal is connected at the instant the head actually enters into the A-segment.

When the terminal a of switch circuit SW is connected, focusing actuator 25 is controlled by the focusing error signal $e_f$ obtained from the four-part photo detector 21 and processing circuit 22. Meanwhile, when the terminal is connected, actuator 25 is controlled by the desired-value signal obtained from the adder 30 after passing through subtractor 31, whereby the position of objective lens 7 is determined by actuator 25. Since the desired value is based on the error signal $e_f$ that is obtained from the preceding entering of the head into the A-segment and the absolute actuator position signal $S_y$, the focusing position at the present entering into the A-segment is controlled to the correct focusing position as determined at the preceding A-segment.

Figure 6A:
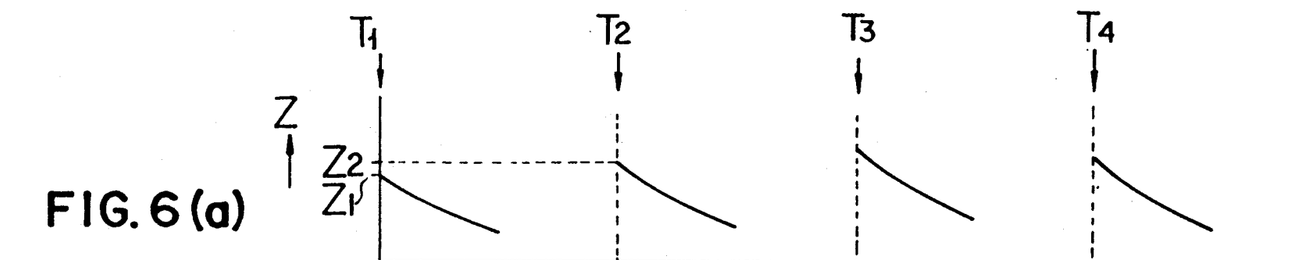
FIGS. 6(a) through 6(d) are signal waveforms useful in explaining the operation of the embodiment of the present invention shown in FIG. 4.

The operation of the above embodiment will be described with regard to an exemplary case where the tape position varies as shown in FIG. 6(a). The tape position Z is represented as a distance from a selected reference position K, as illustrated in FIG. 5. Further, in FIG. 6(b) the lens position as controlled by the focusing control signal is represented as a distance Y from the reference position K.

Figure 6B:
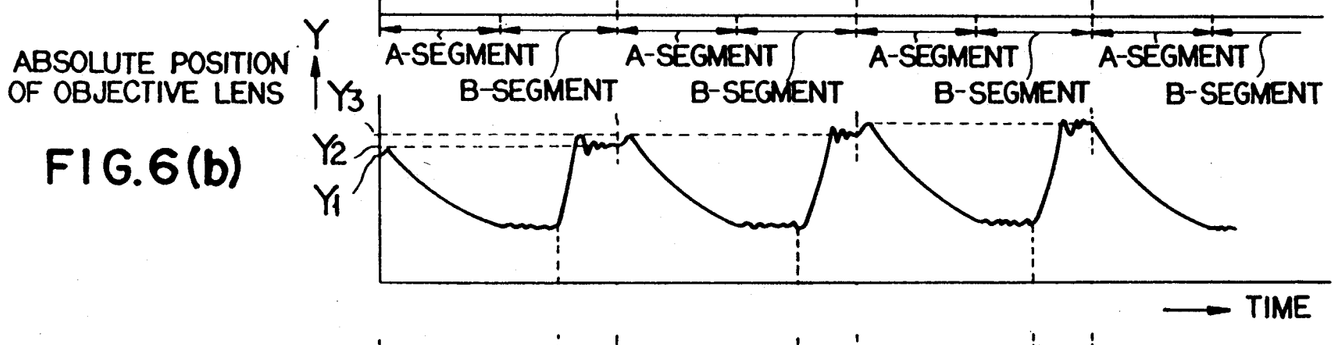
Figure 6C:
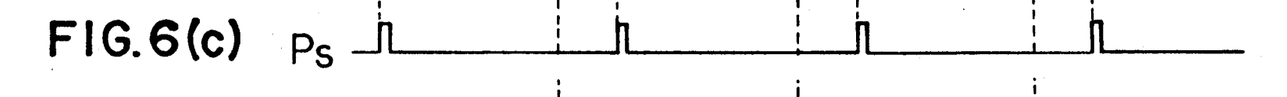
Figure 6D:
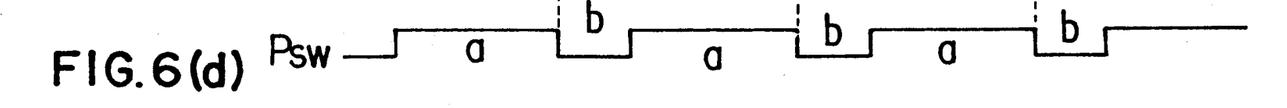

In the A-segment, the lens position is adjusted under follow-up control with the rotation of the rotary drum on which is mounted the optical head and with the motion of the tape, as shown in FIG. 6(b). At the time $T_1$ of an advance into the A-segment, the focusing error signal $e_f$ and the position signal $S_y$ are sampled by S/H circuits 27, 28 in accordance with the sampling pulses $P_s$ shown in FIG. 6(c) from control pulse generator 29. Thereafter, the error signal $e_f$ is no longer available upon entering into the B-segment (non-scanning period), so that no control is executed for actuator 25. Nevertheless, when the terminal b of the switch circuit SW is connected in response to the switching pulse $P_{SW}$ shown in FIG. 6(d) from control pulse generator 29, the operation is started to control actuator 25 in conformity with the desired-value signal produced from the error signal $e_f$ and the position signal $S_y$ at time $T_1$ being held, so that objective lens 7 is controlled to the desired position $Y_2$ before the next entering of the head into the A-segment, as shown in FIG. 6(b). Because the desired value is the result of adding the error signal $e_f$ and the signal $S_y$ representing the actuator position, which corresponds to position $Y_1$ of objective lens 7, at the time $T_1$, it follows that a positional control at a next time $T_2$ is executed to the preceding focusing position determined at the time $T_1$.

The correct focusing position at the time $T_2$ is substantially proximate to the correct focusing position $Y_2$ at the time $T_1$, so that immediately following the time $T_2$ at which the terminal a of the switch circuit SW is selectively connected, a control to the correct focusing position is attained in an extremely short pull-in time interval based on the error signal $e_f$, and thereafter a follow-up control is rendered possible. Thus, due to such short pull-in time interval, it becomes possible to provide a relatively longer effective time for the data recording/reproducing operation.

Subsequently the desired value at a time $T_3$ is determined by the error signal e, and a position signal $S_y$ sampled at the time $T_2$, and a control similar to the foregoing is executed. More specifically, as shown in FIG. 5, the desired lens position at the time $T_3$ is a correct focusing position $Y_3$ at the time $T_2$ and, therefore, it is a position that is determined by adding the absolute position $Y_2$ at the instant $T_2$ and the error $E_2$ at the lime $T_2$. This operation is accomplished by adding signal $S_y$ and signal $e_f$.

The tape states are denoted by $t_{p1}$ and $t_{p2}$ at time $T_1$ and $T_2$, respectively. These tape states $t_{p1}$ and $t_{p2}$ correspond to the tape positions represented at $Z_1$ and $Z_2$ in FIG. 6(a).

In the above-described embodiment, the focusing position at each instant of the optical head entering into the A-segment, in which the head is facing the tape, that is controlled to the correct focusing position may not exactly be attained at the instant the head enters the A-segment. Nevertheless, by following the present invention it becomes possible to start the focusing control operation at a lens position proximate to the correct focused state, whereby the pull-in action to the correct focusing position can be achieved in a short time. Needless to say, a control circuit such as shown in FIG. 4 has to be provided for each of two heads.

Although the above description has been directed to providing focusing control, the same operation is performed with regard to tracking control as well, and the tracking control circuit configuration would also be generally the same as in the block diagram of FIG. 4. More specifically, although not shown the circuit would be so formed that a tracking error signal $e_t$ is produced by a side spot detector and a processing circuit and such error signal $e_t$ supplied to a tracking actuator. There may also be provided a position sensor for a galvano-mirror or a tracking actuator to shift the objective lens. Other components including S/H circuits and an adder would be provided in the tracking control system in the same manner as those employed in the embodiment of FIG. 4. Then, even when a track position has an S-shaped deviation or the like as described in connection with FIG. 3, the same operation is performed as in the embodiment of FIG. 4 so that the tracking position at the instant of entering into the A-segment is controlled to the correct tracking position determined at the instant of the preceding entering into the A-segment, whereby the tracking control can be started from the lens position (angle) proximate to the correct tracking position. Consequently, it becomes possible to achieve the control action relative to the correct tracking position or angle as well in a short time.

In the above-described embodiment, the desired-value setting circuit is arranged to set a desired value by adding the outputs of the S/H circuits 27, 28 to each other by means of the adder 30. Nevertheless, it may be so modified as to hold a desired value by first adding the error signal $e_f$ and the position signal $S_y$ by means of an adder and then sampling the added signal by a S/H circuit.

According to the optical head control circuit of the present invention for the optical tape recording/reproducing apparatus, as described hereinabove, the focusing or tracking positions of an optical head at an instant of its entering into an A-segment in which the head is facing the tape is controlled to the correct focusing position, or the correct tracking position, determined at the instant of the preceding entering into the A-segment, so that a pull-in action for attaining a proper position upon the current entering into the A-segment can be achieved in a short time to consequently prolong the effective recording/reproducing time.

It is to be understood that the above description is presented by way of example only and that many modifications and variations could be effected by one skilled in the art, without departing from the spirit or scope of the invention, which is to be determined by the appended claims.

What is claimed is:

1. An optical head control circuit for an optical tape recording/reproducing apparatus having a rotary optical head, comprising:

error detector means optically coupled to the rotary optical head for generating head position error signals;

head drive means receiving said head position error signals from said error detector means for adjusting the position of said rotary optical head during a scanning period where said rotary optical head is facing the optical tape;

error sampling means connected to said error detector means for sampling error signals at the beginning of said scanning period wherein said rotary optical head faces the optical tape;

head position detecting means coupled to said rotary optical head for generating head position signals; and means for generating head position control signals from said head position signals and the sampled error signals and feeding said head position control signals to said head drive means in place of said head position error signals during a nonscanning period wherein said rotary optical head is not facing the optical tape.

2. An optical head control circuit according to claim 1, further comprising a tape guide drum and wherein the optical tape is wound about said tape guide drum over an angle of substantially 180 degrees, and the rotary optical head includes a pair of heads disposed in said tape guide drum at positions spaced apart from each other by an angle of 180 degrees.

3. An optical head control circuit according to claim 2, wherein said means for generating head position control signals includes a head position sampling circuit connected for sampling said head position signals and a mixing means for mixing the sampled error signals with the sampled head position signals and producing a mixed output signal.

4. An optical head control circuit according to claim 3, wherein said means for generating head position control signals further includes a subtractor circuit for subtracting the head position signals from the mixed output signal from said mixing means.

5. An optical head control circuit according to claim 4, further comprising a control pulse generator for producing switching pulses in response to signals representing a rate of rotation of the rotary optical head, and wherein said means for generating head position control signals includes a switching circuit for selectively connecting said head position error signals or an output of said subtractor circuit to said head drive means in response to said switching pulses.

6. An optical head control circuit according to claim 5, wherein said control pulse generator further produces sampling pulses for controlling said error sampling means and said head position sampling circuit.

* * * * *